US011502316B2

(12) United States Patent
Fujita

(10) Patent No.: US 11,502,316 B2
(45) Date of Patent: Nov. 15, 2022

(54) GAS SUPPLY SYSTEM, FUEL CELL SYSTEM INCLUDING GAS SUPPLY SYSTEM, AND CONTROL METHOD FOR GAS SUPPLY SYSTEM

(71) Applicant: TOYOTA JIDOSHA KABUSHIKI KAISHA, Toyota (JP)

(72) Inventor: Keisuke Fujita, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 486 days.

(21) Appl. No.: 16/529,962

(22) Filed: Aug. 2, 2019

(65) Prior Publication Data

US 2020/0091525 A1    Mar. 19, 2020

(30) Foreign Application Priority Data

Sep. 14, 2018   (JP) .............................. JP2018-172360

(51) Int. Cl.
*H01M 8/04082*   (2016.01)
*H01M 8/0432*    (2016.01)
*H01M 8/04746*   (2016.01)

(52) U.S. Cl.
CPC ... *H01M 8/04201* (2013.01); *H01M 8/04373* (2013.01); *H01M 8/04753* (2013.01); *H01M 8/04776* (2013.01); *H01M 2250/20* (2013.01)

(58) Field of Classification Search
CPC ... H01M 8/04–04179; H01M 8/04223–04231; H01M 8/04298–04303;
(Continued)

(56) References Cited

U.S. PATENT DOCUMENTS 5,901,758 A * 5/1999 Hwang .................. F17C 5/06
                                                  141/2
2006/0246177 A1* 11/2006 Miki ................ H01M 8/04208
                                                 426/24
2012/0216910 A1* 8/2012 Inagi ...................... F17C 5/06
                                                  141/4

FOREIGN PATENT DOCUMENTS

CN          1826492 A        8/2006
JP       2008223784 A *      9/2008 .............. H01M 8/04
(Continued)

OTHER PUBLICATIONS

Machine translation of Yamashita et al., JP 2008-223784. Originally Published Sep. 25, 2008. (Year: 2008).*
(Continued)

*Primary Examiner* — Jonathan Crepeau
*Assistant Examiner* — Jacob Buchanan
(74) *Attorney, Agent, or Firm* — Hunton Andrews Kurth LLP

(57) ABSTRACT

A gas supply system includes: a plurality of tanks that are filled with a gas; a supply pipe that branches and is connected to the plurality of tanks and supplies the gas to a destination of supply; a plurality of shutoff valves that shut off connections between the plurality of tanks and the supply pipe; a plurality of temperature measuring units that measures an internal temperature of the plurality of tanks; and a control unit that determines the shutoff valve that is to be opened first out of the plurality of shutoff valves by using the internal temperatures of the plurality of tanks, which are measured at a time of start of the supply of the gas, when the control unit switching the plurality of shutoff valves from a closed state to an open state at the time of start of the supply of the gas.

6 Claims, 7 Drawing Sheets

(58) Field of Classification Search
CPC .......................... H01M 8/04313–0447; H01M 8/04694–04761; H01M 8/04776–04783; H01M 8/2405; H01M 8/2445; H01M 8/2457

See application file for complete search history.

(56) References Cited

FOREIGN PATENT DOCUMENTS

| | | | | | |
|---|---|---|---|---|---|
| JP | 2008298103 | A | * | 12/2008 | ............. Y02E 60/50 |
| JP | 2013253672 | A | * | 12/2013 | ................ F17C 7/00 |
| JP | 2015069910 | A | | 4/2015 | |
| JP | 2017157283 | A | | 9/2017 | |

OTHER PUBLICATIONS

Machine Translation of Kato JP 2013-253672. Originally Published Dec. 19, 2013 (Year: 2013).*
Machine Translation of Okamoto, JP 2008-298103. Originally published Dec. 11, 2008 (Year: 2008).*

* cited by examiner

US 11,502,316 B2

GAS SUPPLY SYSTEM, FUEL CELL SYSTEM INCLUDING GAS SUPPLY SYSTEM, AND CONTROL METHOD FOR GAS SUPPLY SYSTEM

INCORPORATION BY REFERENCE

The disclosure of Japanese Patent Application No. 2018-172360 filed on Sep. 14, 2018 including the specification, drawings and abstract is incorporated herein by reference in its entirety.

BACKGROUND

1. Technical Field

The disclosure relates to a gas supply system, a fuel cell system including a gas supply system, and a control method for a gas supply system.

2. Description of Related Art

For example, Japanese Unexamined Patent Application Publication No. 2017-157283 (JP 2017-157283 A) discloses a gas supply system that supplies a fuel gas to a fuel cell in a fuel cell system. The gas supply system described in JP 2017-157283 A supplies a fuel gas from a plurality of tanks to an anode of a fuel cell via a merging flow passage which is connected to each of the plurality of tanks via branch flow passages. Start and stop of supply of a fuel gas to the respective tanks are carried out by controlling opening and closing of a shutoff valve which is a main stop valve provided in each of the branch flow passages.

SUMMARY

Without being limited to a gas supply system which is used in a fuel cell system, a gas supply system that supplies a compressed gas such as a high-pressure gas from a plurality of tanks and includes a supply pipe that merges gases flowing from the respective tanks and guides the merged gas to a destination of supply is also known. In many cases, components such as a pressure sensor or a valve are attached to the supply pipe in a state in which a pressure of a gas flowing in the supply pipe is applied to the components. The supply pipe or the components attached to the supply pipe may be subjected to a remarkable impact due to a rapid increase of a gas pressure when a shutoff valve is opened to start supply of a gas to a destination of supply after each tank has been supplied with a gas. When such impact is repeated whenever each tank is supplied with a gas, there is a likelihood that durability of the supply pipe or the components attached to the supply pipe will decrease remarkably.

The technique according to the disclosure can be embodied in the following aspects.

A first aspect provides a gas supply system. The gas supply system includes: a plurality of tanks that are filled with a gas, the gas filled in the plurality of tanks being compressed; a supply pipe that branches and is connected to the plurality of tanks, the supply pipe being configured such that the gas to be supplied to a destination of supply flows through the supply pipe; a plurality of shutoff valves that are configured to shut off connections between the plurality of tanks and the supply pipe; a plurality of temperature measuring units configured to measure internal temperatures of the plurality of tanks; and a control unit configured to execute valve opening control for switching the plurality of shutoff valves from a closed state to an open state when at a time of start of supply of the gas. The control unit is configured to determine the shutoff valve that is to be opened first out of the plurality of shutoff valves by using the internal temperatures of the plurality of tanks which are measured by the temperature measuring units at the time of start of the supply of the gas in the valve opening control.

With the gas supply system according to this aspect, when the shutoff valves are opened to start supply of a gas to a destination of supply, a tank having a relatively low internal pressure can be easily identified as a tank of which the shutoff valve is to be opened first based on the internal temperatures of the tanks which have a correlation with the internal pressures of the tanks. Accordingly, an impact which is applied to the supply pipe or components attached to the supply pipe due to a gas pressure when the shutoff valves of the tanks are opened to start supply of a gas can be reduced and it is thus possible to curb a decrease in durability thereof.

The gas supply system according to the aspect may further include a replenishment pipe that causes the gas to branch and flow into the plurality of tanks. In the valve opening control after replenishment of the plurality of tanks with the gas via the replenishment pipe has been completed in a state in which the plurality of shutoff valves are closed, the control unit may be configured to first open the shutoff valve which is provided for the tank having a largest variation of the internal temperature which is obtained by subtracting second temperatures of the plurality of tanks, which are measured by the temperature measuring units at the time of start of the supply of the gas, from first temperatures of the plurality of tanks which are measured by the temperature measuring units at a time of completion of the replenishment of the plurality of tanks with the gas out of the plurality of tanks.

With the gas supply system according to this aspect, it is possible to accurately identify a tank of which the internal pressure is the lowest at the time of start of the supply of a gas due to a decrease of the internal temperatures after the tanks are replenished with the gas via the replenishment pipe. Accordingly, it is possible to further reduce an impact which is applied to the supply pipe or components attached to the supply pipe due to a gas pressure at the time of starting of supply of a gas.

In the gas supply system according to the aspect, the control unit may be configured to first open the shutoff valve which is provided for the tank having a lowest internal temperature measured by the temperature measuring unit at the time of start of the supply of the gas out of the plurality of tanks in the valve opening control.

With the gas supply system according to this aspect, it is possible to prevent the supply pipe or components attached to the supply pipe from being subjected to a thermal load due to a rapid increase in temperature at the time of starting of supply of a gas after the tanks have been replenished with the gas. Accordingly, it is possible to further curb a decrease in durability of the supply pipe or components attached to the supply pipe.

In the gas supply system according to the aspect, a downstream component to which a pressure is applied from the gas when the gas flows through the supply pipe may be attached to the supply pipe, and the control unit may be configured to first open the shutoff valve having a smallest flow passage length of the gas to the downstream component out of the shutoff valves that are candidates when there are a plurality of shutoff valves that are candidates for being opened first in the valve opening control.

With the gas supply system according to this aspect, it is possible to reduce an impact which is applied to the downstream component due to collision with the gas at the time of starting of supply of a gas after the tanks have been replenished with the gas. Accordingly, it is possible to further curb a decrease in durability of the downstream component.

In the gas supply system according to the aspect, a downstream component to which a pressure is applied from the gas when the gas flows through the supply pipe may be attached to the supply pipe, and the control unit may be configured to first open the shutoff valve having a smallest flow passage length of the gas to the downstream component out of the shutoff valves provided for the tanks having a largest variation of the internal temperature when there are a plurality of tanks having the largest variation of the internal temperature in the valve opening control.

In the gas supply system according to the aspect, the control unit may be configured to first open the shutoff valve which is provided for the tank having the lowest second temperature out of a plurality of tanks having a largest variation of the internal temperature when there are a plurality of tanks having the largest variation of the internal temperature in the valve opening control.

With the gas supply system according to this aspect, it is possible to reduce an impact or a thermal load which is applied to the supply pipe or components attached to the supply pipe at the time of starting of supply of a gas after the tanks have been replenished with the gas.

A second aspect of the disclosure provides a fuel cell system. The fuel cell system according to the second aspect includes a fuel cell and the gas supply system according to one of the aspects configured to supply a reactant gas to the fuel cell.

With the fuel cell system according to this aspect, it is possible to reduce an impact which is applied to the supply pipe or components attached to the supply pipe due to a rapid increase of a gas pressure when the shutoff valves are opened to start generation of electric power in the fuel cell. Accordingly, it is possible to curb a decrease in durability of the supply pipe or components attached to the supply pipe in the gas supply system and to curb occurrence of supply failure of a reactant gas to the fuel cell due to deterioration of constituent components of the gas supply system.

A third aspect of the disclosure provides a control method for a gas supply system. The control method for a gas supply system according to this aspect includes: measuring internal temperatures of a plurality of tanks at a time of start of supply of a gas from the plurality of tanks to a destination of supply via a supply pipe, which branches and is connected to the plurality of tanks, the supply pipe being configured such that the gas to be supplied to the destination of supply flows through the supply pipe, when switching a plurality of shutoff valves configured to shut off connections between the supply pipe and the plurality of tanks from a closed state to an open state; and determining the shutoff valve that is to be opened first out of the plurality of shutoff valves by using the measured internal temperatures of the plurality of tanks to start the supply of the gas.

The disclosure may be embodied in various forms other than the gas supply system, the fuel cell system including the gas supply system, and the control method for the gas supply system. For example, the disclosure may be embodied in forms such as a vehicle in which gas supply system is mounted, a control method for a fuel cell system or a vehicle, a computer program for embodying such a control method, and a non-transitory recording medium having the computer program recorded thereon.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

1. First Embodiment

Figure 1:
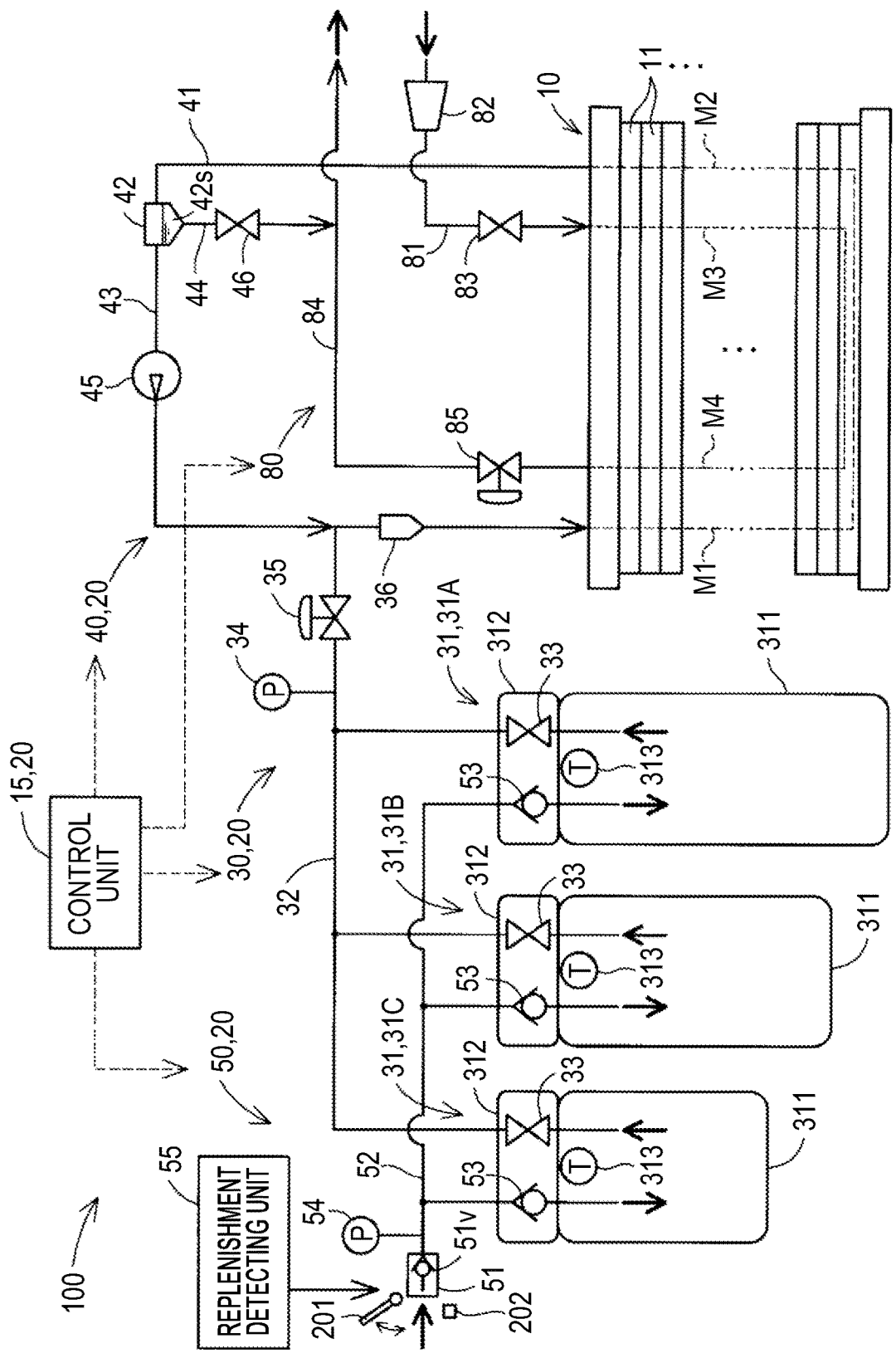
FIG. 1 is a diagram schematically illustrating a configuration of a fuel cell system including a gas supply system.

FIG. 1 is a diagram schematically illustrating a configuration of a fuel cell system 100 including a gas supply system 20 according to a first embodiment. The fuel cell system 100 includes a fuel cell 10 that is supplied with a fuel gas and an oxidant gas and generates electric power and a control unit 15 that controls power generation in the fuel cell 10. The fuel cell system 100 includes the gas supply system 20 according to the first embodiment that performs supply of the fuel gas to the fuel cell 10 and circulation of the fuel gas and an oxidant gas supply and discharge unit 80 that performs supply and discharge of the oxidant gas to and from the fuel cell 10.

In the first embodiment, the fuel cell system 100 is mounted in a fuel-cell vehicle. Electric power which is generated by the fuel cell 10 in the fuel cell system 100 is used for the fuel-cell vehicle to run and is also consumed in auxiliary machinery or electrical equipment of the fuel-cell vehicle. Electric power that is generated by the fuel cell 10 may also be used for external supply.

The fuel cell 10 is a solid polymer type fuel cell that generates electric power through electrochemical reactions between a fuel gas and an oxidant gas which are reactant gases. In the first embodiment, the fuel gas is hydrogen and the oxidant gas is oxygen contained in the air. The fuel cell 10 has a stacked structure in which a plurality of unit cells 11 are stacked. Each unit cell 11 is a power generation element that can generate electric power independently. Each unit cell 11 includes a membrane-electrode assembly which is a power generator with electrodes disposed on both surfaces of an electrolyte membrane and two separators between which the membrane-electrode assembly is interposed. The electrolyte membrane is a solid polymer electrolyte membrane that exhibits excellent proton conductivity in a wet state including moisture therein. The elements of each unit cell 11 are not illustrated.

Manifolds M1 to M4 which are branch flow passages for allowing a reactant gas to flow into the unit cells 11 are provided in the fuel cell 10. The first manifold M1 communicates with an inlet of an anode of each unit cell 11, and the second manifold M2 communicates with an outlet of the anode of each unit cell 11. The third manifold M3 communicates with an inlet of a cathode of each unit cell 11, and the fourth manifold M4 communicates with an outlet of the cathode of each unit cell 11.

The fuel cell 10 is not limited to a solid polymer type fuel cell. In another embodiment, various types of fuel cells that are supplied with a reactant gas and generate electric power, such as a solid oxide type fuel cell, can be employed as the fuel cell 10.

The control unit 15 is constituted by an electronic control unit (ECU) including one or more central processing units (CPUs) and a main storage device. The control unit 15 embodies various functional units that control generation of electric power in the fuel cell 10 by causing a CPU to execute a program or a command read onto the main storage device.

In the first embodiment, the control unit 15 also serves as a control unit of the gas supply system 20 and executes various controls for the gas supply system 20 which will be described later. The control unit 15 is one element of the gas supply system 20. In another embodiment, the control unit of the gas supply system 20 may be provided separately from the control unit 15 of the fuel cell system 100.

The gas supply system 20 supplies a fuel gas, which is replenished from the outside of the gas supply system 20 and is stored therein, to the fuel cell 10. The gas supply system 20 includes a supply unit 30 that takes charge of storage and supply of the fuel gas, a circulation unit 40 that circulates the fuel gas, which is discharged from the fuel cell 10 without being used to generate electric power, into the fuel cell 10, and a replenishment unit 50 that replenishes the supply unit 30 with the fuel gas. The supply unit 30 includes a plurality of tanks 31 that are filled with the fuel gas, a supply pipe 32 that connects the tanks 31 to the fuel cell 10, and a plurality of shutoff valves 33 that are provided to correspond to the tanks 31.

Each tank 31 stores the fuel gas. The fuel gas stored in each tank 31 is compressed. In the first embodiment, each tank 31 is formed as a high-pressure gas tank. Each tank 31 preferably has a pressure resistance of 35 MPa or more and more preferably has a pressure resistance of 70 MPa or more.

In the first embodiment, the supply unit 30 includes three tanks 31A, 31B, and 31C as the plurality of tanks 31. The tanks 31A, 31B, and 31C have different chargeable capacities with the fuel gas. The chargeable capacities of the tanks 31A, 31B, and 31C with the fuel gas decrease in the order of the first tank 31A, the second tank 31B, and the third tank 31C. In the following description, the three tanks 31A, 31B, and 31C are collectively referred to as "tanks 31" when they do not need to be distinguished from each other.

The number of tanks 31 which are included in the gas supply system 20 is not limited to three. In another embodiment, the gas supply system 20 may include two or more tanks 31. In another embodiment, the chargeable capacities of the tanks 31 with the fuel gas may be the same in some tanks 31 or all the tanks 31.

Each tank 31 includes a tank body 311 that is formed of a hollow container, a cap 312 that seals an opening of the tank body 311, and a temperature measuring unit 313 that is disposed in the tank body 311. The tank body 311 has a structure in which a surface layer of a resin liner is covered with a reinforced fiber layer. The reinforced fiber layer is formed by thermally curing a thermoset resin which is impregnated into carbon fiber wound on the surface layer of the resin liner. In another embodiment, the tank body 311 may include a metallic liner instead of the resin liner.

The cap 312 is a metal component that is air-tightly attached to an opening (not illustrated) which is formed at one end of the tank body 311. A shutoff valve 33 and a check valve 53 which will be described later are integrally attached to the cap 312.

The temperature measuring unit 313 is constituted by a temperature sensor. The temperature measuring unit 313 is disposed in an internal space of the tank body 311 and is exposed to the fuel gas which is filled in the tank 31. The temperature measuring unit 313 measures an internal temperature of the tank 31 and outputs the result of measurement to the control unit 15.

The downstream side of the supply pipe 32 is connected to the first manifold M1 of the fuel cell 10. The upstream side of the supply pipe 32 branches and is connected to the tanks 31 via the shutoff valves 33. The fuel gas which is supplied from the tanks 31 to the anode of the fuel cell 10 flows in the supply pipe 32.

Each shutoff valve 33 is a main stop valve of the corresponding tank 31 and is opened and closed under the control of the control unit 15. The shutoff valve 33 shuts off connection between the corresponding tank 31 and the supply pipe 32. The control unit 15 suppresses a rapid increase in pressure in the supply pipe 32 due to opening of the shutoff valves 33 by determining a valve opening order of the shutoff valves 33 using temperature information of the internal temperatures of the tanks 31 which are acquired from the temperature measuring units 313 in valve opening control which will be described later.

The supply unit 30 further includes a pressure measuring unit 34 that measures a pressure of the fuel gas which flows in the supply pipe 32, a pressure control valve 35 that adjusts the pressure of the fuel gas in the supply pipe 32, and an injector 36 that injects the fuel gas into the fuel cell 10. Downstream from the tanks 31, the pressure measuring unit 34, the pressure control valve 35, and the injector 36 are arranged in the supply pipe 32 in this order from upstream. In the following description, components that are attached to the supply pipe 32 downstream from the tanks 31 (the shutoff valves 33) and are exposed to a gas flowing in the supply pipe 32, such as the pressure measuring unit 34, the pressure control valve 35, and the injector 36, are also referred to as "downstream components."

The pressure measuring unit 34 transmits the measurement result to the control unit 15. The pressure control valve 35 is a pressure regulator and adjusts a pressure upstream from the injector 36. A degree of opening of the pressure control valve 35 is controlled by the control unit 15. The injector 36 is an electromagnetically driven switching valve. A drive cycle of the injector 36 is controlled by the control unit 15. The control unit 15 controls the degree of opening of the pressure control valve 35 and the drive cycle of the injector 36 based on the measurement result from the pressure measuring unit 34 such that a supply pressure or a supply amount of the fuel gas to the anode of the fuel cell 10 is controlled when the fuel cell 10 generates electric power.

The circulation unit 40 includes an anode exhaust gas pipe 41 that is connected to the fuel cell 10, a gas-liquid separation unit 42 that is connected to the anode exhaust gas pipe 41, and a circulation pipe 43 and a drainage pipe 44 that are connected to the gas-liquid separation unit 42. The circulation unit 40 further includes a circulation pump 45 that is provided in the circulation pipe 43 and a drainage valve 46 that is provided in the drainage pipe 44.

The anode exhaust gas pipe 41 is connected to the second manifold M2 of the fuel cell 10 and guides an anode exhaust gas which is discharged from the fuel cell 10 via the second manifold M2 to the gas-liquid separation unit 42. The anode exhaust gas includes the fuel gas, an inert gas, and moisture which are discharged from the anode of the fuel cell 10.

The gas-liquid separation unit 42 separates the flowing anode exhaust gas into a gas component and a liquid component. The gas component is guided from the gas-liquid separation unit 42 to the circulation pipe 43. The liquid component is stored as waste water in a reservoir 42s of the gas-liquid separation unit 42.

The circulation pipe 43 is connected to an upstream side of the injector 36 in the supply pipe 32. The control unit 15 drives the circulation pump 45 such that the gas component of the anode exhaust gas flowing in the circulation pipe 43 flows into the supply pipe 32 of the supply unit 30 when the fuel cell 10 generates electric power. Accordingly, the fuel gas included in the anode exhaust gas circulates into the fuel cell 10 via the supply pipe 32 of the supply unit 30 and it is thus possible to enhance usage efficiency of the fuel gas.

The drainage pipe 44 is connected to the reservoir 42s of the gas-liquid separation unit 42. The drainage valve 46 of the drainage pipe 44 is opened and closed under the control of the control unit 15. When the fuel cell 10 generates electric power, the control unit 15 opens the drainage valve 46 to discharge waste water stored in the gas-liquid separation unit 42 via the drainage pipe 44 when a predetermined valve opening cycle arrives. In the first embodiment, the drainage pipe 44 is connected to a cathode exhaust gas pipe 84 which will be described later, and waste water stored in the gas-liquid separation unit 42 is discharged to the outside of the fuel cell system 100 via the cathode exhaust gas pipe 84.

In another embodiment, the circulation unit 40 of the gas supply system 20 may be omitted. In this case, for example, an anode exhaust gas may be discharged from the anode exhaust gas pipe 41 connected to the second manifold M2 to the outside of the fuel cell system 100 without performing any process.

The replenishment unit 50 includes a receptacle 51 that receives the fuel gas, a replenishment pipe 52 that connects the receptacle 51 to the tanks 31, and a plurality of check valves 53 that are provided to correspond to the tanks 31. The replenishment unit 50 includes a replenishment pressure measuring unit 54 that is provided in the replenishment pipe 52 and a replenishment detecting unit 55 that detects replenishment of the tanks 31 with the fuel gas.

Replenishment of the tanks 31 of the supply unit 30 with the fuel gas is performed via the receptacle 51. The receptacle 51 is provided in a body of a fuel-cell vehicle to be opened to the outside of the fuel-cell vehicle. The receptacle 51 is normally closed with a lid 201 that is rotatably attached to the body of the fuel-cell vehicle except when replenishment with the fuel gas is performed.

The receptacle 51 receives connection of an injection nozzle of the fuel gas which is included in a replenishment source of the fuel gas in a state in which the lid 201 is open. The replenishment source of the fuel gas is, for example, a dispenser that is installed in a hydrogen station. The fuel gas injected from the injection nozzle flows into the replenishment pipe 52 via the receptacle 51. An inlet check valve 51v that prevents leakage of the fuel gas to the outside is provided in the receptacle 51.

A communication unit 202 that is used for the control unit 15 to communicate with the replenishment source of the fuel gas is provided in the vicinity of the receptacle 51. The communication unit 202 is constituted, for example, by an infrared communication device.

The replenishment pipe 52 branches and is connected to the tanks 31 via the check valves 53 provided to correspond to the tanks 31. As described above, each check valve 53 is integrally attached to the cap 312 of the corresponding tank 31 along with the corresponding shutoff valve 33 of the supply unit 30. The fuel gas which is supplied from the receptacle 51 branches and flows into the tanks 31 via the replenishment pipe 52. Each check valve 53 prevents a reverse flow of the fuel gas from the corresponding tank 31 to the replenishment pipe 52. Accordingly, as will be described later with reference to FIG. 4, the internal pressures of the tanks 31 are almost the same immediately after replenishment of the tanks 31 with the fuel gas has been completed via the replenishment pipe 52.

The replenishment pressure measuring unit 54 measures a pressure of the fuel gas flowing in the replenishment pipe 52 and transmits the measured pressure to the control unit 15. The control unit 15 starts communication with the replenishment source of the fuel gas via the communication unit 202 at the time of replenishment of the tanks 31 with the fuel gas. The control unit 15 transmits the measurement result of a pressure from the replenishment pressure measuring unit 54 and the measurement result of the internal temperatures of the tanks 31 from the temperature measuring units 313 to the replenishment source of the fuel gas. Such information is used for control of an amount of the fuel gas which is replenished on the replenishment source side of the fuel gas.

The replenishment detecting unit 55 is constituted, for example, by a sensor that electrically detects covering of the receptacle 51 with the lid 201. The control unit 15 detects start of replenishment of the tanks 31 with the fuel gas when the lid 201 is opened and the receptacle 51 is opened. The control unit 15 detects completion of replenishment of the tanks 31 with the fuel gas when the receptacle 51 is covered with the lid 201.

In another embodiment, the replenishment detecting unit 55 may be constituted, for example, by a sensor that electrically detects connection between the receptacle 51 and the injection nozzle of the replenishment source of the fuel gas. In this case, the control unit 15 detects start of replenishment of the tanks 31 with the fuel gas when the injection nozzle is connected to the receptacle 51, and detects completion of replenishment of the tanks 31 with the fuel gas when the injection nozzle is disconnected from the receptacle 51.

In another embodiment, the replenishment detecting unit 55 may be embodied by a functional unit of the control unit 15 instead of the sensor. The control unit 15 may detect start of replenishment of the tanks 31 with the fuel gas, for example, when a predetermined increase in pressure is detected by the replenishment pressure measuring unit 54 of the replenishment pipe 52, and detect completion of replenishment of the tanks 31 with the fuel gas when a predetermined decrease in pressure is then detected. Alternatively, the control unit 15 may detect start of replenishment of the tanks 31 with the fuel gas when communication with the replenishment source of the fuel gas is started, and detect completion of replenishment of the tanks 31 with the fuel gas when the communication with the replenishment source of the fuel gas has ended.

The oxidant gas supply and discharge unit 80 includes a cathode gas pipe 81 that is connected to the third manifold M3 of the fuel cell 10, a compressor 82 that is provided in the cathode gas pipe 81, and a switching valve 83 that is provided in the cathode gas pipe 81. The compressor 82 is driven under the control of the control unit 15. When the fuel cell 10 generates electric power, the control unit 15 causes the compressor 82 to compress outside air which is introduced via an air intake which is not illustrated and to supply the outside air to the cathodes of the unit cells 11 of the fuel cell 10 via the cathode gas pipe 81. The switching valve 83 is normally closed and is opened when compressed air with a predetermined pressure or more is sent from the compressor 82.

The oxidant gas supply and discharge unit 80 further includes a cathode exhaust gas pipe 84 that is connected to the fourth manifold M4 of the fuel cell 10 and a pressure control valve 85 that is provided in the cathode exhaust gas pipe 84. The cathode exhaust gas pipe 84 guides a cathode exhaust gas discharged from the cathode of the fuel cell 10 to the outside of the fuel cell system 100. The cathode exhaust gas includes an oxidant gas which has not been consumed in the cathode of the fuel cell 10, an inert gas, and moisture which exists on the cathode side of the fuel cell 10. When the fuel cell 10 generates electric power, the control unit 15 controls the degree of opening of the pressure control valve 85 such that the pressure in the cathode exhaust gas pipe 84, that is, the back pressure on the cathode side of the fuel cell 10, is controlled.

Preferably, the fuel cell system 100 further includes a refrigerant supply unit that causes a refrigerant to flow in a flow passage provided between the unit cells 11 of the fuel cell 10 and controls an operating temperature of the fuel cell 10. In this specification, illustration and detailed description of the refrigerant supply unit will be omitted.

Figure 2:
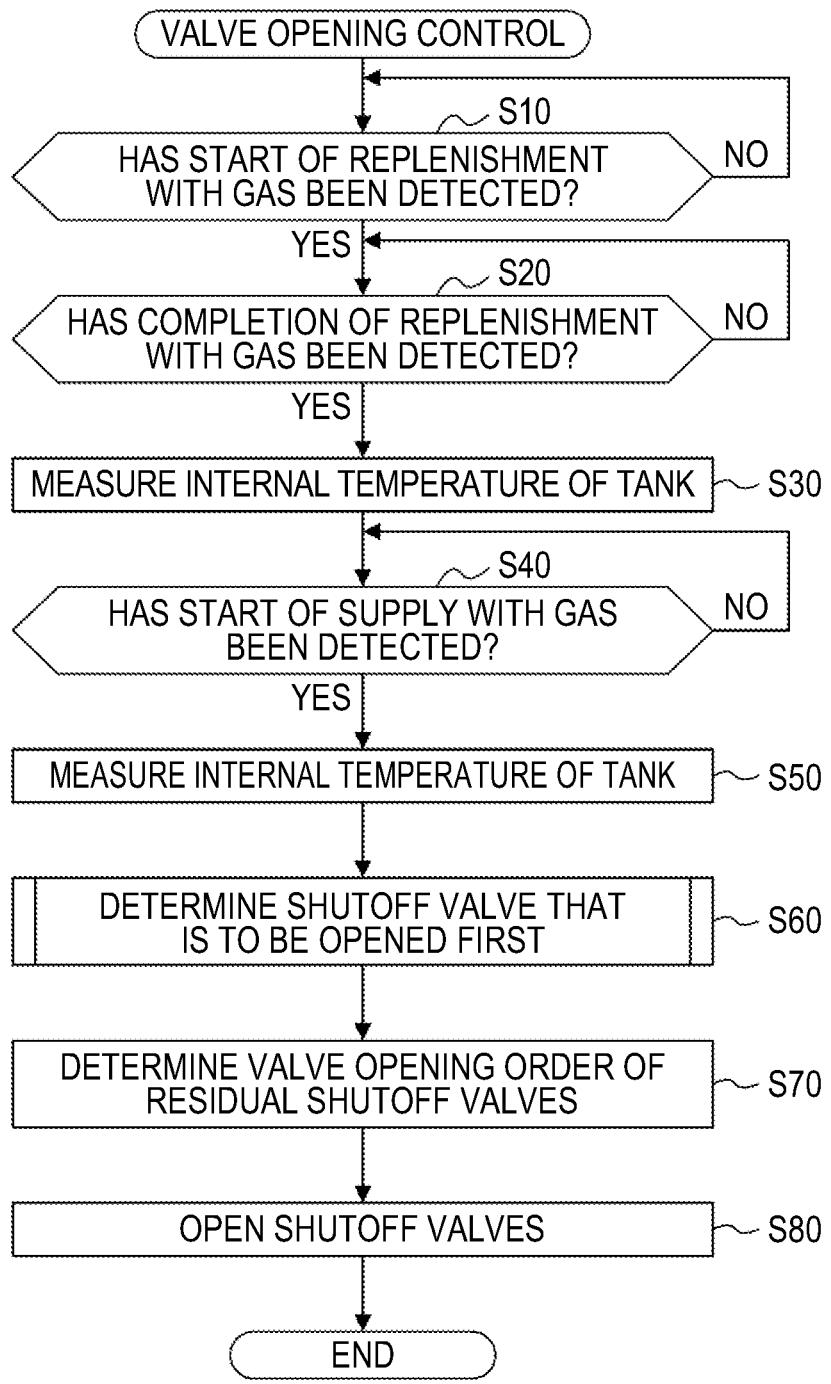
FIG. 2 is a diagram illustrating a flow of valve opening control according to a first embodiment.

FIG. 2 is a diagram illustrating a flow of valve opening control which is executed by the gas supply system 20 according to the first embodiment. Valve opening control is control which is executed by the control unit 15 to switch the shutoff valves 33 from a closed state to an open state at a time of start of supply of the fuel gas to a destination of supply. In this valve opening control, at the time of start of the supply of the fuel gas from the supply unit 30 after the respective tanks 31 of the supply unit 30 have been replenished with the fuel gas via the replenishment unit 50, the shutoff valve 33 which is to be opened first is determined out of the shutoff valves 33 of the tanks 31. In the first embodiment, a valve opening order of the plurality of shutoff valves 33 is determined. Through this valve opening control, defects due to a rapid increase of a pressure in the supply pipe 32 at the time of starting of supply of the fuel gas via the supply pipe 32 is curbed.

The control unit 15 starts this valve opening control after the shutoff valves 33 of the tanks 31 have been closed to shut off connections between the supply pipe 32 and the tanks 31 and to stop supply of the fuel gas from the supply unit 30. The valve opening control is started, for example, when a driver of a fuel-cell vehicle performs an ignition-off operation of the fuel-cell vehicle and the control unit 15 stops generation of power in the fuel cell 10.

In Step S10, the control unit 15 detects start of replenishment of the tanks 31 with the fuel gas using the replenishment detecting unit 55. As indicated by an arrow of NO in Step S10, the valve opening control is in a standby state until start of replenishment of the tanks 31 with the fuel gas is detected by the replenishment detecting unit 55. For example, when an instruction to start generation of electric power in the fuel cell 10 such as an ignition-ON operation by an operator is received in the standby state, the control unit 15 determines that replenishment of the tanks 31 with the fuel gas has not been performed, ends the valve opening control, and starts normal supply control of the fuel gas.

After start of replenishment of the tanks 31 with a fuel gas has been detected as indicated by an arrow of YES in Step S10, the control unit 15 detects completion of replenishment of the tanks 31 with a fuel gas using the replenishment detecting unit 55 in Step S20. Until completion of replenishment of the tanks 31 with a fuel gas is detected, that is, while the tanks 31 are being replenished with a fuel gas via the replenishment unit 50, the valve opening control is in the standby state as indicated by an arrow of NO in Step S20. After completion of replenishment of the tanks 31 with a fuel gas has been detected as indicated by an arrow of YES in Step S20, the control unit 15 measures the internal temperatures of the tanks 31 using the temperature measuring units 313 in Step S30.

In Step S40, the control unit 15 detects start of supply of a fuel gas. More specifically, the control unit 15 detects an instruction to start supply of a fuel gas. In the first embodiment, an instruction to start supply of a fuel gas is, for example, an instruction to start generation of electric power in the fuel cell 10 such as an ignition-ON operation by an operator. As indicated by an arrow of NO in Step S40, the valve opening control is in the standby state until an instruction to start supply of a fuel gas is detected. When an instruction to start supply of a fuel gas is detected as indicated by an arrow of YES in Step S40, the control unit 15 measures the internal temperatures of the tanks 31 using the temperature measuring units 313 in Step S50.

In Step S60, the control unit 15 performs a determination process of determining the shutoff valve 33 which is to be opened first out of a plurality of shutoff valves 33 provided for the tanks 31 using the internal temperatures of the tanks 31 which are measured in Step S50 at the time of start of the supply of a fuel gas. In the first embodiment, the control unit 15 determines the shutoff valve 33 which is to be opened first using the internal temperatures of the tanks 31 measured when replenishment of the tanks 31 with a fuel gas has been completed in Step S30 along with the internal temperatures of the tanks 31 measured in Step S50.

Figure 3:
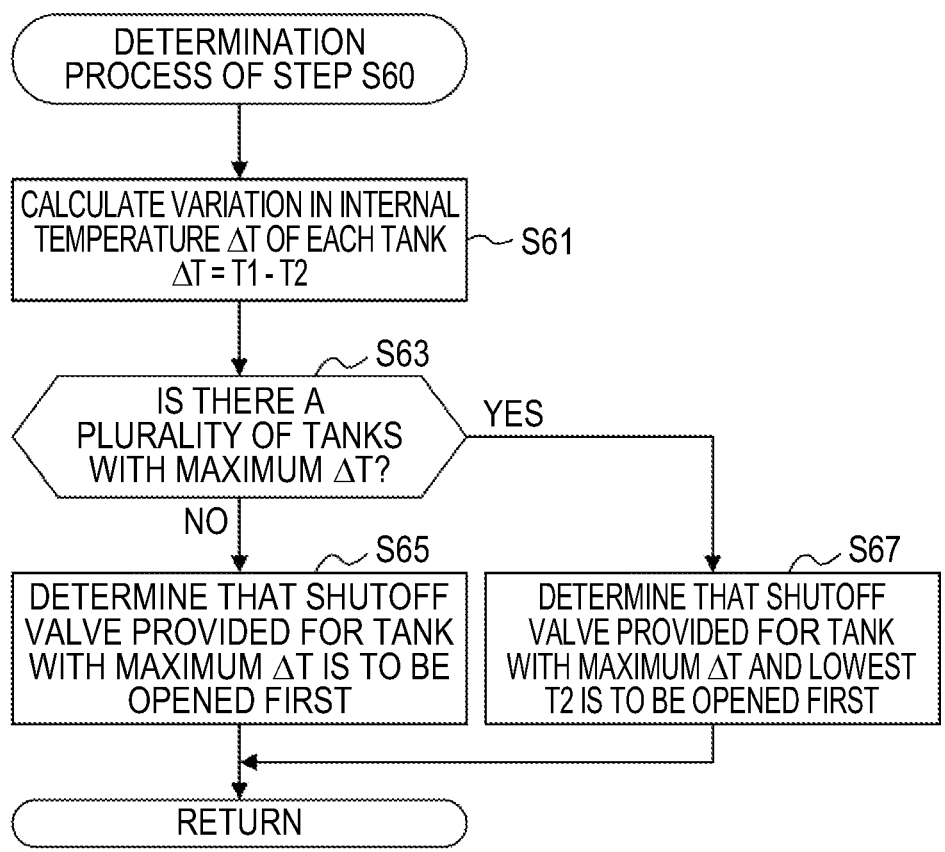
FIG. 3 is a diagram illustrating a flow of a determination process according to the first embodiment.

FIG. 3 is a diagram illustrating a flow of the determination process which is performed in Step S60 of the valve opening control. In Step S61, the control unit 15 calculates variations $\Delta T$ of the internal temperatures of the tanks 31 from a time point at which replenishment with a fuel gas has been completed to a time point at which an instruction to start supply of a fuel gas is detected.

Here, the temperatures which are measured in Step S30 of the valve opening control illustrated in FIG. 2, that is, the internal temperatures of the tanks 31 which are measured by the temperature measuring units 313 at a time of completion of the replenishment with a fuel gas, are defined as first temperatures T1. The temperatures which are measured in Step S50 of the valve opening control illustrated in FIG. 2, that is, the internal temperatures of the tanks 31 which are measured by the temperature measuring units 313 at the time of start of the supply of a fuel gas, are defined as second temperatures T2. In Step S61, the control unit 15 calculates the variations $\Delta T$ of the internal temperatures by subtracting the second temperatures T2 from the first temperatures T1. In general, the internal temperatures of the tanks 31 are the highest when replenishment with a fuel gas has been completed, and thus the variations $\Delta T$ of the internal temperatures are positive values greater than 0.

In Step S63, the control unit 15 compares the variations $\Delta T$ of the internal temperatures and determines whether there are a plurality of tanks 31 having the highest variation ΔT of the internal temperatures. In comparison between the variations ΔT of the internal temperatures by the control unit 15, the variations ΔT of the internal temperatures having different values are determined to be substantially the same when the variations ΔT of the internal temperatures are in a predetermined range of measurement errors. For example, the control unit 15 determines that two variations ΔT of the internal temperatures are substantially the same when there is a difference of ±5% between the two variations ΔT of the internal temperatures.

When one tank 31 having the largest variation ΔT of the internal temperature is identified, the control unit 15 determines the shutoff valve 33 provided for the tank 31 as the shutoff valve 33 which is to be opened first in Step S65. When there are a plurality of tanks 31 having the largest variation ΔT of the internal temperature, the number of shutoff valves 33 which are to be opened first is two or more. In this case, the control unit 15 determines the shutoff valve 33 provided for the tank 31 having the lowest second temperature T2 out of the tanks 31 having the largest variation ΔT of the internal temperature as the shutoff valve 33 which is to be opened first in Step S67. When there are three or more tanks 31 having the largest variation ΔT of the internal temperature, the control unit 15 determines that the shutoff valves are opened sequentially from the shutoff valve 33 provided for the tank 31 having the lowest second temperature T2. The reason for determining the shutoff valve 33 which is to be opened first using this method will be described later.

Description will be continued with reference back to FIG. 2. In Step S70, the control unit 15 determines a valve opening order of the other shutoff valves 33. In the first embodiment, the control unit 15 determines that the shutoff valve 33 in which the second temperature T2 as the internal temperature of the tank 31 which is measured in Step S50 at the time of start of the supply of a fuel gas is lower is opened earlier. Accordingly, it is possible to curb a rapid increase in the temperature of a fuel gas flowing in the supply pipe 32 at the time of starting of supply of a fuel gas. Accordingly, it is possible to prevent a thermal load from being applied to the supply pipe 32 or downstream components attached to the supply pipe 32. In Step S70 of another embodiment, the control unit 15 may determine that the shutoff valve 33 which is provided for the tank 31 having the largest variation ΔT of the internal temperature is opened earlier.

In Step S80, the control unit 15 performs a valve opening process of opening the shutoff valves 33 of the tanks 31 in the valve opening order determined in Steps S60 to S70. The interval between the valve opening times of the shutoff valves 33 may be set to, for example, 1 second or less or several seconds. The control unit 15 ends the valve opening control and starts supply control of a fuel gas for causing the fuel cell 10 to generate electric power.

Figure 4:
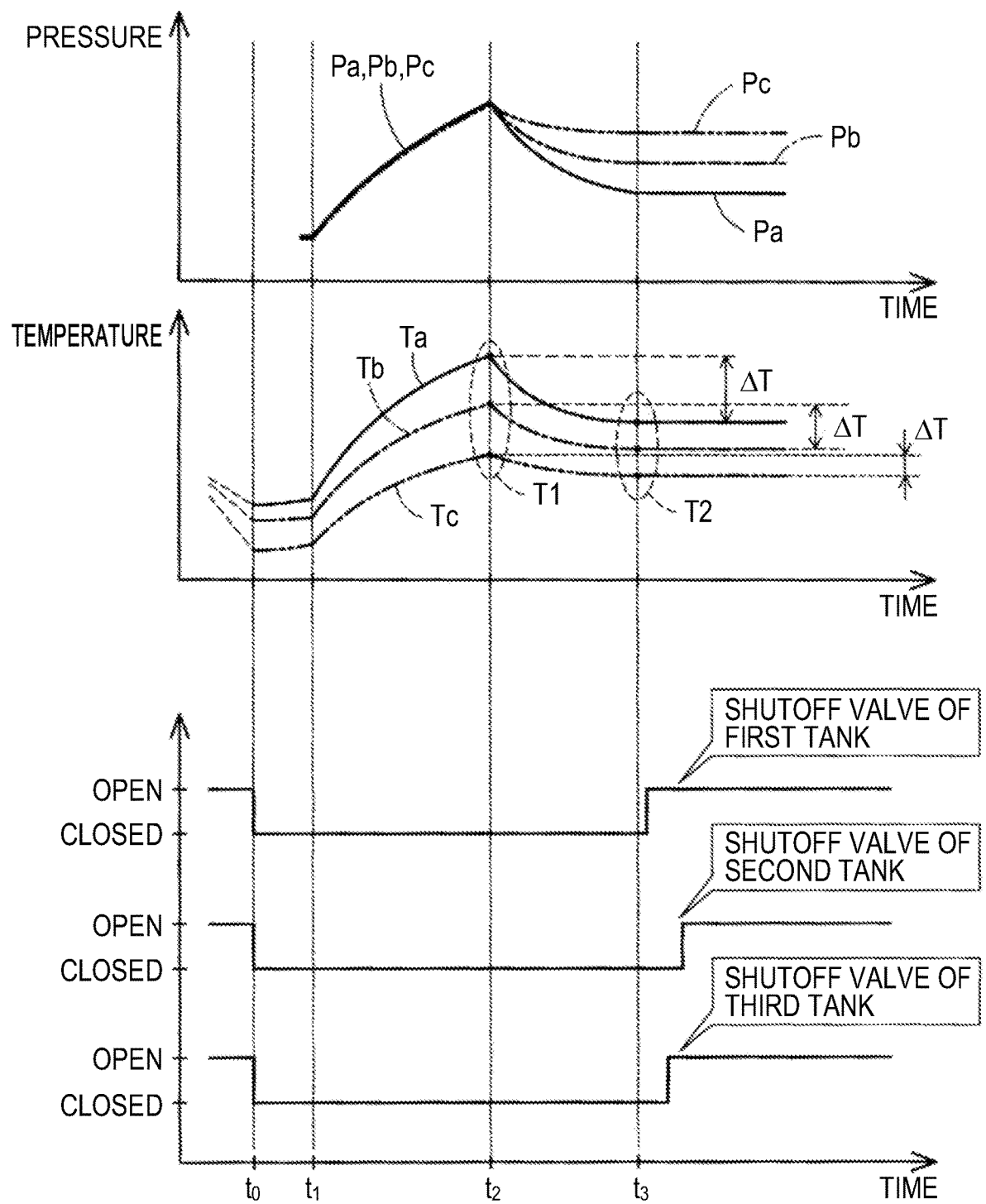
FIG. 4 is a diagram illustrating temporal variations of an internal pressure and an internal temperature of a tank and times of opening of a shutoff valve.

Graphs representing examples of temporal variations of the internal pressures Pa, Pb, and Pc and the internal temperatures Ta, Tb, and Tc of the tanks 31A, 31B, and 31C while the valve opening control is being executed are illustrated in FIG. 4. In FIG. 4, timing charts representing examples of the times at which the shutoff valves 33 of the tanks 31A, 31B, and 31C are opened and closed are illustrated to correspond to the graphs of the internal pressures Pa, Pb, and Pc and the internal temperatures Ta, Tb, and Tc of the tanks 31.

At time to, for the purpose of replenishment with a fuel gas, the shutoff valves 33 provided for the tanks 31A, 31B, and 31C are closed and supply of a fuel gas to the fuel cell 10 by the gas supply system 20 is stopped. At this time point, the internal temperatures Ta, Tb, and Tc of the tanks 31 becomes different from each other. This difference is caused due to a difference between the configurations of the tanks 31 or a variation in usage environment until now. The difference between the internal temperatures of the tanks 31 is caused due to a difference in an outflow amount of a fuel gas with respect to the capacities of the tanks 31, a difference in a distance of the tanks 31 to a heat source such as the fuel cell 10, a difference in heat dissipation based on the shapes or the positions of the tanks 31, or the like.

In a period of times $t_1$ to $t_2$, the tanks 31 are filled with a fuel gas via the replenishment pipe 52 of the replenishment unit 50. In this period, since a fuel gas branches and flows into the tanks 31 via the replenishment pipe 52, the internal pressures Pa, Pb, and Pc of the tanks 31 increase almost equally and the internal pressures Pa, Pb, and Pc of the tanks 31 at time $t_2$ are almost the same. On the other hand, the internal temperatures Ta, Tb, and Tc of the tanks 31 vary differently depending on the tanks 31 in the period of times $t_1$ to $t_2$. The difference in variation is, for example, due to a difference between the internal temperatures Ta, Tb, and Tc of the tanks 31 at the time point of starting of replenishment with a fuel gas, a difference in capacity between the tanks 31, a difference in a distance between the tanks 31 and a heat source such as the fuel cell 10, a difference in heat dissipation based on the shapes or the positions of the tanks 31, or the like. In Step S30 of the valve opening control illustrated in FIG. 2, the internal temperatures Ta, Tb, and Tc of the tanks 31 at time $t_2$ are measured as the first temperatures T1.

After replenishment of the tanks 31 with a fuel gas has been completed at time $t_2$, the control unit 15 detects an instruction to start generation of electric power in the fuel cell 10, that is, an instruction to start supply of a fuel gas by the gas supply system 20, at time $t_3$. The period of times $t_2$ to $t_3$ corresponds to a time until the fuel-cell vehicle is started to run after replenishment with a fuel gas has been completed in a hydrogen station. The period of times $t_2$ to $t_3$ is a short period such as one minute or several minutes. In the period of times $t_2$ to $t_3$, the internal temperatures Ta, Tb, and Tc of the tanks 31 decrease and the internal pressures Pa, Pb, and Pc of the tanks 31 also decrease with the decrease in temperature. The decrease of the internal temperatures Ta, Tb, and Tc in the period of times $t_2$ to $t_3$ is affected by various conditions. These various conditions include, for example, the internal temperatures Ta, Tb, and Tc at the time of completion of replenishment with a fuel gas, capacities of the tanks 31A, 31B, and 31C, the distances between the tanks 31A, 31B, and 31C and a heat source, and heat dissipation based on the shapes or the positions of the tanks 31A, 31B, and 31C.

In Step S50 of the valve opening control illustrated in FIG. 2, the internal temperatures of the tanks 31 at time $t_3$ are measured as the second temperatures T2. The variations ΔT of the internal temperatures which are used to determine the shutoff valve 33 which is to be opened first in Step S60 correspond to the decreases of the internal temperatures of the tanks 31 in the period of times $t_2$ to $t_3$ in FIG. 4 and are values in which various conditions specific to the tanks 31 are reflected. The internal pressures of the tanks 31 at the time of starting of supply of a fuel gas are lowered from a common internal pressure of the tanks 31 at the time of completion of replenishment of the tanks 31 with a fuel gas depending on the magnitudes of the variations ΔT of the internal temperatures acquired for the tanks 31. Accordingly, the tank 31 having the largest variation ΔT of the internal temperature has a lowest internal pressure at the time of starting of supply of a fuel gas. In this way, by using the variations ΔT of the internal temperatures which vary depending on various conditions specific to the tanks 31, it is possible to simply and accurately identify the tank 31 having the lowest internal pressure at the time of start of the supply of a fuel gas after the tanks 31 are replenished with a fuel gas.

After time $t_3$ in FIG. 4, the shutoff valves 33 of the tanks 31 are opened in the order which is determined in Steps S60 and S70 of the valve opening control illustrated in FIG. 2. In the example illustrated in FIG. 4, the shutoff valve 33 of the first tank 31A having the largest variation ΔT of the internal temperature is opened first. The shutoff valve 33 of the third tank 31C having the lowest second temperature T2 is then opened, and the shutoff valve 33 of the second tank 31B is finally opened.

As described above, with the valve opening control according to the first embodiment, the shutoff valve 33 of the tank 31 in which the variation ΔT of the internal temperature is the largest and the internal pressure is the lowest after replenishment with a fuel gas is opened first. Accordingly, an impact due to a gas pressure which is applied to the supply pipe 32 or the downstream components thereof is reduced when supply of a fuel gas to the fuel cell 10 which is a destination of supply is started. Accordingly, whenever supply of a fuel gas is started after replenishment of the tanks 31 with a fuel gas has been completed, the supply pipe 32 and the downstream components thereof are prevented from deteriorating with a repeated impact due to a gas pressure. As a result, it is possible to curb a decrease in durability of the supply pipe 32 or the downstream components thereof.

In the valve opening control according to the first embodiment, the control unit 15 uses the variations ΔT of the internal temperatures of the tanks 31 to determine the shutoff valve 33 which is to be opened first. As described above with reference to FIG. 4, the internal pressures of the tanks 31 after replenishment with a fuel gas has been completed differ between the tanks 31 due to various conditions such as the difference in supply conditions of a fuel gas before replenishment with a fuel gas or an arrangement environment such as the capacities and shapes of the tanks 31. The difference between the variations ΔT of the internal temperatures appropriately represents the difference in the internal pressure which is caused due to conditions specific to the tanks 31. Accordingly, with the valve opening control according to the first embodiment, it is possible to more accurately and simply identify the tank 31 in which the internal pressure is the lowest at the time of starting of supply of a fuel gas without providing a pressure sensor for measuring an internal pressure in each tank 31.

With the valve opening control according to the first embodiment, when there are a plurality of tanks 31 having the largest variation ΔT of the internal temperature and there are a plurality of shutoff valves 33 that are candidates for being opened first, the shutoff valve 33 of the tank 31 having the lowest second temperature T2 which is the internal pressure measured at the time of starting of supply of a fuel gas is determined to be opened first. Accordingly, it is possible to cause a fuel gas of a lower temperature to flow first in the supply pipe 32 and thus to curb thermal deterioration of the supply pipe 32 and the downstream components thereof.

Since the fuel cell system 100 according to the first embodiment includes the above-mentioned gas supply system 20, it is possible to curb supply failure or leakage of a fuel gas due to deterioration of the supply pipe 32 or the downstream components thereof. In addition, with the gas supply system 20, the fuel cell system 100 including the gas supply system 20, and the control method for the gas supply system 20 according to the first embodiment, various operational advantages which have been described above in the first embodiment can be achieved.

2. Second Embodiment

Figure 5:
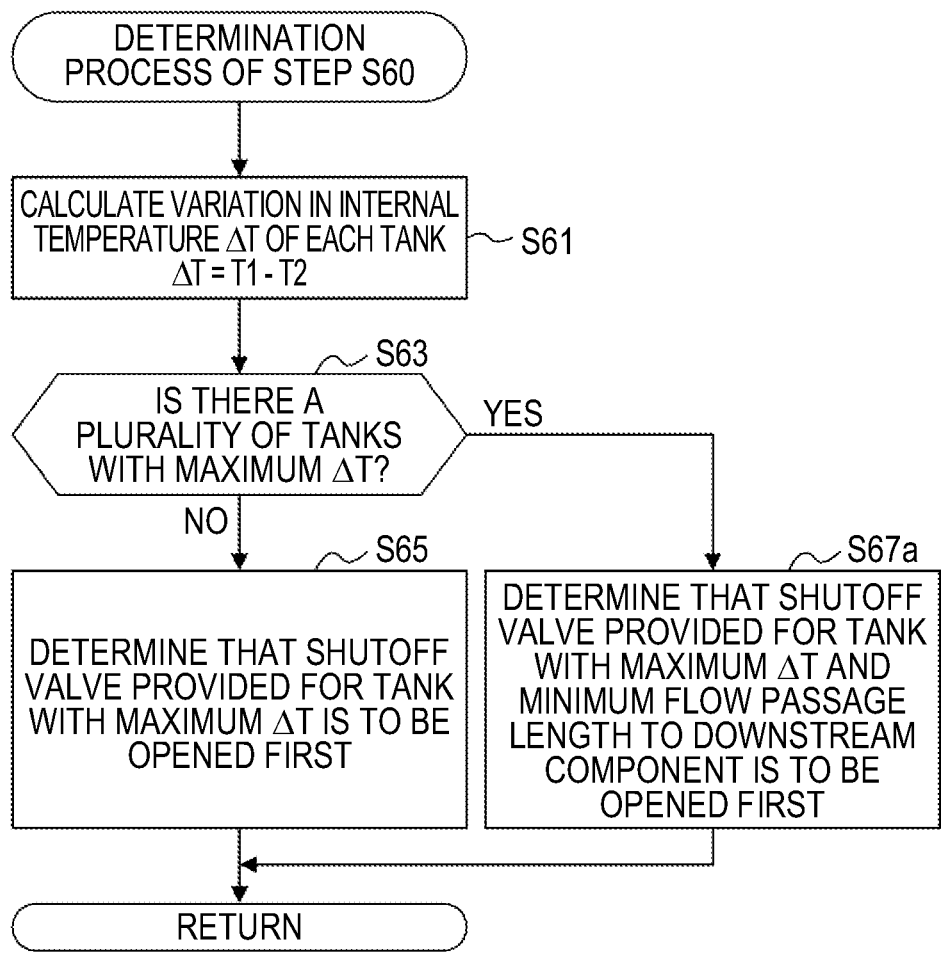
FIG. 5 is a diagram illustrating a flow of a determination process according to a second embodiment.

FIG. 5 is a diagram illustrating a flow of a determination process of determining a shutoff valve 33 which is to be opened first, which is performed in valve opening control according to a second embodiment. A gas supply system according to the second embodiment that executes the valve opening control according to the second embodiment has the same system configuration as the gas supply system 20 according to the first embodiment illustrated in FIG. 1. The valve opening control according to the second embodiment is executed in the same way as described in the first embodiment, except that details of the determination process of Step S60 are different. The flow of the determination process in the second embodiment is almost the same as the flow of the determination process according to the first embodiment illustrated in FIG. 3, except that the process of Step S67a in the second embodiment is performed instead of the process of Step S67 described in the first embodiment.

In the determination process according to the second embodiment, when there are a plurality of tanks 31 having the largest variation ΔT of the internal temperature, the control unit 15 determines the shutoff valve having the smallest gas flow passage length to the downstream components out of the shutoff valves 33 which are candidates as the shutoff valve which is to be first opened in Step S67a. The "gas flow passage length" refers to a length of the supply pipe 32 from the corresponding tank 31 to the downstream component. That is, the shutoff valve 33 of the tank 31 that is connected to most downstream in the supply pipe 32 out of the tanks 31 having the largest variation ΔT of the internal temperature is determined to be opened first. When there are three or more shutoff valves 33 which are candidates, the control unit 15 determines that the shutoff valves are sequentially opened from the shutoff valve 33 having the smallest gas flow passage length to the downstream component. Accordingly, when one shut off valve 33 is opened first, a pressure which is applied to the downstream component of the supply pipe 32 due to collision with a fuel gas can be reduced and thus it is possible to curb aging damage and deterioration of the downstream component. In addition, with the gas supply system 20, the fuel cell system 100 including the gas supply system 20, and the control method for the gas supply system 20 according to the second embodiment, various operational advantages which have been described above in the first and second embodiments can be achieved.

3. Third Embodiment

Figure 6:
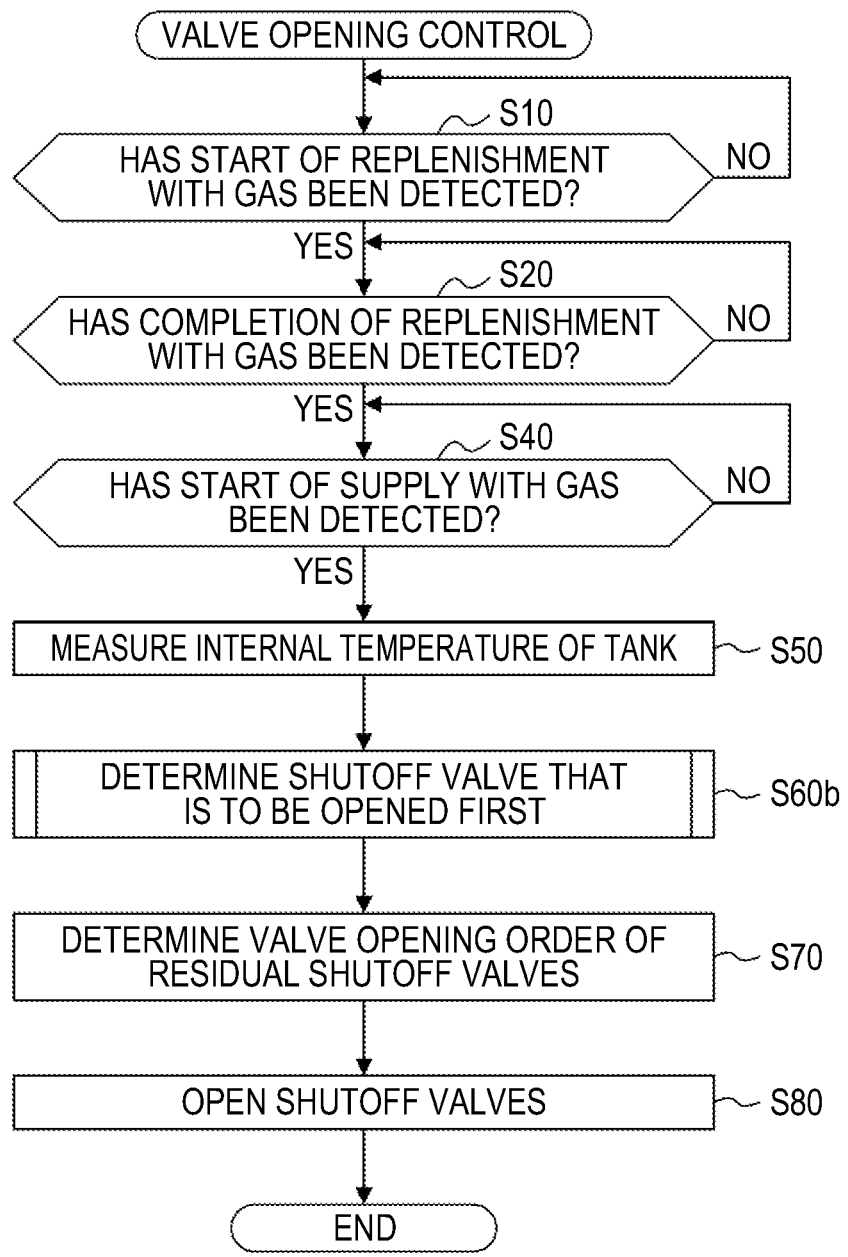
FIG. 6 is a diagram illustrating a flow of valve opening control according to a third embodiment.

FIG. 6 is a diagram illustrating a flow of valve opening control according to a third embodiment. A gas supply system according to the third embodiment that executes the valve opening control according to the third embodiment has the same system configuration as the gas supply system 20 according to the first embodiment illustrated in FIG. 1. The valve opening control according to the third embodiment is almost the same as described in the second embodiment, except for the following points. In the valve opening control according to the third embodiment, Step S30 is omitted and the control unit 15 may not measure the internal temperatures of the tanks 31 after replenishment of the tanks 31 with a fuel gas has been completed. In the valve opening control according to the third embodiment, the determination process of Step S60b in which the conditions for determining the shutoff valve 33 which is to be opened first are different is performed instead of the determination process of Step S60 in the second embodiment illustrated in FIG. 5.

Figure 7:
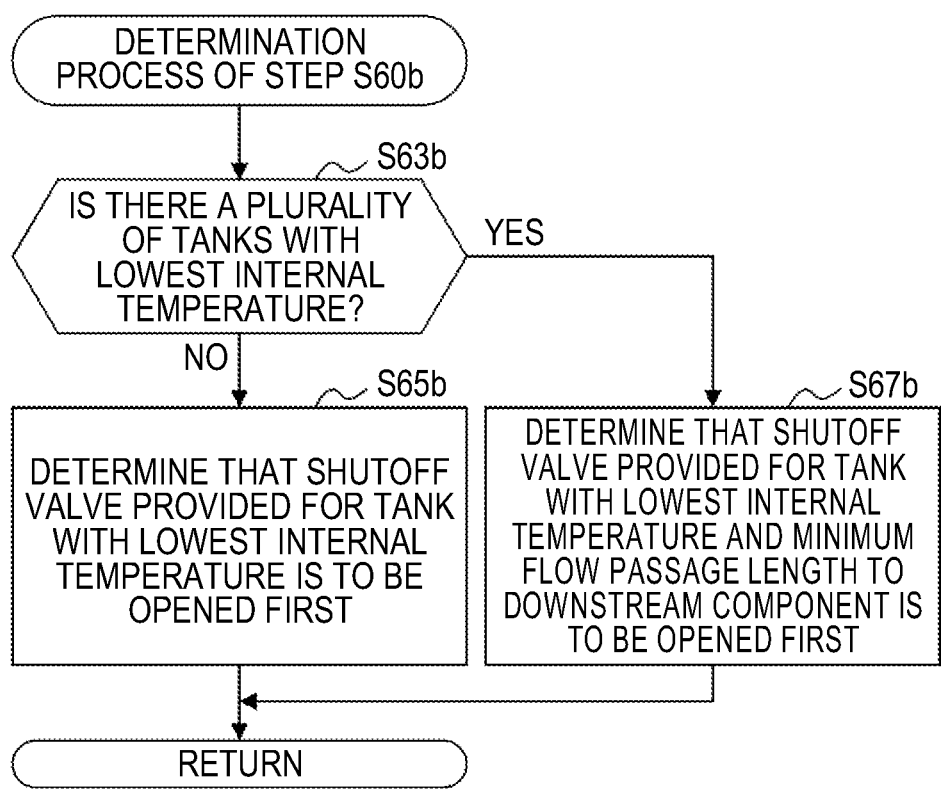
FIG. 7 is a diagram illustrating a flow of a determination process according to the third embodiment.

FIG. 7 is a diagram illustrating a flow of a determination process of determining the shutoff valve 33 which is to be opened first, which is performed in Step S60b of the valve opening control according to the third embodiment. In the determination process according to the third embodiment, after an instruction to start supply of a fuel gas has been detected in Step S40 illustrated in FIG. 6, the shutoff valve 33 which is to be opened first is determined using the internal temperatures of the tanks 31, which are measured in Step S50, at the time of starting of supply of a fuel gas.

In Step S63b, the control unit 15 performs comparison of the internal temperatures of the tanks 31 and determines whether there are a plurality of tanks 31 having the lowest internal temperature. In comparison of the internal temperatures which is performed by the control unit 15, the internal temperatures having different values are determined to be the same when they are within a predetermined range of measurement errors. For example, the control unit 15 determines that two internal temperatures are the same even when the two internal temperatures have a difference of ±5%.

When one tank 31 having the lowest internal temperature can be identified, the control unit 15 determines the shutoff valve 33 provided for the tank 31 as the shutoff valve 33 which is to be opened first in Step S65b. When there are a plurality of tanks 31 having the lowest internal temperature, the control unit 15 determines the shutoff valve having the smallest flow passage length to the downstream component of the supply pipe 32 out of the shutoff valves 33 of the tanks 31 having the lowest internal temperature as the shutoff valve 33 which is to be opened first in Step S67b. When there are three or more tanks 31 having the lowest internal temperature, the control unit 15 determines that the shutoff valves are sequentially opened from the shutoff valve 33 having the smallest flow passage length to the downstream component.

With the valve opening control according to the third embodiment, the shutoff valve 33 of the tank 31 having the lowest internal temperature is opened first. Accordingly, it is possible to prevent a fuel gas of a high temperature from flowing into the supply pipe 32 from the beginning when the shutoff valve 33 is opened first to rapidly increase the temperature of the supply pipe 32 and the downstream component thereof. Accordingly, when replenishment of the tanks 31 with a fuel gas has been completed, the supply pipe 32 and the downstream component thereof are prevented from deteriorating due to repeated thermal loads with the rapid increase in temperature. There is a high likelihood that the internal pressure of the tank 31 having the lowest internal temperature will be low. Accordingly, it is possible to prevent the supply pipe 32 or the downstream component thereof rom being subjected to an impact due to the pressure of a fuel gas flowing into the supply pipe 32 at the time of starting of supply of a fuel gas. Accordingly, when replenishment of the tanks 31 with a fuel gas has been completed, the supply pipe 32 and the downstream component thereof are prevented from deteriorating due to repeated impacts of a gas pressure.

With the valve opening control according to the third embodiment, when there are a plurality of shutoff valves 33 that are candidates for being opened first, the shutoff valve 33 having the smallest flow passage length to the downstream component out of the shutoff valves 33 that are candidates for being opened first. Accordingly, when the shutoff valve 33 is opened first, it is possible to reduce a pressure which is applied to the supply pipe 32 and the downstream component thereof due to collision with a fuel gas and to curb aging damage and deterioration of the downstream component. In addition, with the gas supply system 20, the fuel cell system 100 including the gas supply system 20, and the control method for the gas supply system 20 according to the third embodiment, various operational advantages which have been described above in the first, second, and third embodiments can be achieved.

4. Other Embodiments

Various configurations described above in the embodiments can be modified, for example, as follows. The embodiments which will be described below are examples of the aspects for carrying out the disclosure similarly to the above-mentioned embodiments.

(1) Other Embodiment 1

In Steps S60 and S60b of the above-mentioned embodiments, when there are a plurality of tanks 31 having the largest variation ΔT of the internal temperature or there are a plurality of tanks 31 having the lowest internal temperature at the time of start of the supply of a fuel gas, the shutoff valves 33 which are provided for the plurality of tanks 31 may be simultaneously opened. Alternatively, the shutoff valve 33 which is to be opened first out of the plurality of shutoff valves 33 provided for the plurality of tanks 31 may be determined based on a priority which is determined in advance.

(2) Other Embodiment 2

In Step S70 in the valve opening control according to the above-mentioned embodiments, the control unit 15 may determine that the shutoff valve 33 having the shorter flow passage length to the downstream component is opened earlier. In the valve opening control according to the above-mentioned embodiment, Step S70 may be omitted. In the valve opening process of Step S80 in this case, after the shutoff valve 33 which is determined to be opened first in Steps S60 and S60b has been opened, the other shutoff valves 33 may be opened simultaneously or based on a predetermined priority order.

(3) Other Embodiment 3

In the above-mentioned embodiments, the gas supply system 20 may not process an exhaust gas which is discharged from the fuel cell 10 but may perform only supply of a fuel gas to the fuel cell 10. The gas supply system 20 may be applied as a system that supplies an oxidant gas instead of a fuel gas to the cathode of the fuel cell 10. In this case, each tank 31 is filled with an oxidant gas. In the above-mentioned embodiments, the gas supply system 20 may not be incorporated into the fuel cell system 100 and may supply a gas to a destination of supply other than the fuel cell 10. For example, the gas supply system 20 may supply hydrogen to a hydrogen engine. The gas supply system 20 may supply a gas other than hydrogen to a destination of supply. For example, the gas supply system 20 may supply a natural gas to a combustion system that consumes the natural gas.

(4) Other Embodiment 4

In the above-mentioned embodiments, the gas supply system 20 may open the shutoff valves 33 in the state in which the shutoff valves 33 are closed to start supply of a fuel gas through the same processes as Steps S60 and S60b to S80, except after replenishment of the tanks 31 with a fuel gas has been completed. In this case, the control unit 15 may determine, for example, that the shutoff valve 33 provided for the tank 31 having the lowest internal temperature measured at the time of starting of supply of a fuel gas is to be opened first, like the third embodiment. Alternatively, the control unit 15 may measure and store the internal temperatures of the tanks when the shutoff valves 33 are closed in a nonvolatile manner and determine the shutoff valve 33 which is to be opened first using the stored internal temperatures and the internal temperatures of the tanks 31 which are measured at the time of starting of supply of a fuel gas. In this case, the control unit 15 may first open the shutoff valve 33 provided for the tank 31 having the largest variation of the internal temperature which is obtained by subtracting the internal temperature of the tank 31 at the time of starting of supply of a fuel gas from the internal temperature of the tank 31 in a state in which the shutoff valve 33 is closed.

5. Others

In the above-mentioned embodiments, some or all of the functions and processes which are embodied in software may be embodied in hardware. Some or all of the functions and processes which are embodied in hardware may be embodied in software. For example, various circuits such as an integrated circuit, discrete circuits, or a circuit module in which such circuits are combined can be used as hardware.

The disclosure is not limited to the above-mentioned embodiments, examples, and modified examples and can be embodied in various forms without departing from the gist of the disclosure. For example, technical features of the embodiments, examples, and modified examples corresponding to technical features of the aspects described in the SUMMARY can be appropriately exchanged or combined to solve some all of the above-mentioned problems or to achieve some or all of the above-mentioned advantages. The technical features can be appropriately deleted as long as they are not described as being essential in this specification as well as they are described as not being essential in this specification.

What is claimed is:

1. A gas supply system comprising:
   a plurality of tanks that are filled with a gas, the gas filled in the plurality of tanks being compressed;
   a supply pipe that branches and is connected to the plurality of tanks, the supply pipe being configured such that the gas to be supplied to a destination of supply flows through the supply pipe;
   a plurality of shutoff valves that are configured to shut off connections between the plurality of tanks and the supply pipe;
   a plurality of temperature measuring units configured to measure internal temperatures of the plurality of tanks;
   a replenishment pipe that causes the gas to branch and flow into the plurality of tanks to replenish the same; and
   a control unit configured to execute valve opening control for switching the plurality of shutoff valves from a closed state to an open state at a time of start of supply of the gas, the control unit being configured to determine the shutoff valve that is to be opened first out of the plurality of shutoff valves by using the internal temperatures of the plurality of tanks which are measured by the temperature measuring units at the time of start of the supply of the gas in the valve opening control,
   wherein the control unit is further configured to,
   in the valve opening control after replenishment of the plurality of tanks with the gas via the replenishment pipe has been completed in a state in which the plurality of shutoff valves are closed, obtain variations of the internal temperatures by subtracting second temperatures of the plurality of tanks, which are measured by the temperature measuring units at the time of start of the supply of the gas, from first temperatures of the plurality of tanks which are measured by the temperature measuring units at a time of completion of the replenishment of the plurality of tanks with the gas out of the plurality of tanks;
   compare the variations of the internal temperatures of the plurality of tanks; and
   open a first shutoff valve provided for a first tank earlier than a second shutoff valve provided for a second tank based on the comparison, the first tank having a larger variation of the internal temperature than a variation of the internal temperature of the second tank, the first shutoff valve and the second shutoff valve being included in the plurality of shutoff valves, and the first tank and the second tank being included in the plurality of tanks.

2. The gas supply system according to claim 1, wherein a downstream component to which a pressure is applied from the gas when the gas flows through the supply pipe is attached to the supply pipe, and
   wherein the control unit is configured to first open the shutoff valve having a smallest flow passage length of the gas to the downstream component out of the shutoff valves that are candidates when there are a plurality of shutoff valves that are candidates for being opened first in the valve opening control.

3. The gas supply system according to claim 1, wherein a downstream component to which a pressure is applied from the gas when the gas flows through the supply pipe is attached to the supply pipe, and
   wherein the control unit is configured to first open the shutoff valve having a smallest flow passage length of the gas to the downstream component out of the shutoff valves provided for the tanks having a largest variation of the internal temperature when there are a plurality of tanks having the largest variation of the internal temperature in the valve opening control.

4. The gas supply system according to claim 1, wherein the control unit is configured to first open the shutoff valve which is provided for the tank having the lowest second temperature out of a plurality of tanks having a largest variation of the internal temperature when there are a plurality of tanks having the largest variation of the internal temperature in the valve opening control.

5. A fuel cell system comprising:
   a fuel cell; and
   the gas supply system according to claim 1 configured to supply a reactant gas to the fuel cell.

6. A control method for a gas supply system comprising:
   measuring internal temperatures of a plurality of tanks at a time of start of supply of a gas from the plurality of tanks to a destination of supply via a supply pipe, which branches and is connected to the plurality of tanks to replenishing the same, the supply pipe being configured such that the gas to be supplied to the destination of supply flows through the supply pipe, when switching a plurality of shutoff valves configured to shut off connections between the supply pipe and the plurality of tanks from a closed state to an open state;
   determining the shutoff valve that is to be opened first out of the plurality of shutoff valves by using the measured internal temperatures of the plurality of tanks to start the supply of the gas;
   obtaining variations of the measured internal temperatures by subtracting second temperatures of the plurality of tanks, which are measured by the temperature measuring units at the time of start of the supply of the gas, from first temperatures of the plurality of tanks which are measured by the temperature measuring units at a time of completion of replenishment of the plurality of tanks with the gas out of the plurality of tanks;

comparing the variations of the internal temperatures of the plurality of tanks; and opening a first shutoff valve provided for a first tank earlier than a second shutoff valve provided for a second tank based on the comparison, the first tank having a larger variation of the internal temperature than a variation of the internal temperature of the second tank, the first shutoff valve and the second shutoff valve being included in the plurality of shutoff valves, and the first tank and the second tank being included in the plurality of tanks.

* * * * *